United States Patent
Shuai (10) Patent No.: US 10,405,361 B2
(45) Date of Patent: Sep. 3, 2019

(54) SWITCHING-ON METHOD, BASE STATION, BASE STATION CONTROLLER, SWITCHING-ON SYSTEM AND STORAGE MEDIUM

(71) Applicant: ZTE CORPORATION, Guangdong (CN)

(72) Inventor: Zhe Shuai, Guangdong (CN)

(73) Assignee: ZTE CORPORATION (CN)

( * ) Notice: Subject to any disclaimer, the term of this patent is extended or adjusted under 35 U.S.C. 154(b) by 58 days.

(21) Appl. No.: 15/522,081

(22) PCT Filed: Apr. 27, 2015

(86) PCT No.: PCT/CN2015/077499
§ 371 (c)(1),
(2) Date: Apr. 26, 2017

(87) PCT Pub. No.: WO2016/065875
PCT Pub. Date: May 6, 2016

(65) Prior Publication Data
US 2017/0359844 A1    Dec. 14, 2017

(30) Foreign Application Priority Data
Oct. 27, 2014  (CN) .......................... 2014 1 0584295

(51) Int. Cl.
*H04J 3/08* (2006.01)
*H04W 76/10* (2018.01)
(Continued)

(52) U.S. Cl.
CPC ........... *H04W 76/10* (2018.02); *H04W 24/02* (2013.01); *H04W 76/11* (2018.02); *H04W 88/12* (2013.01);
(Continued)

(58) Field of Classification Search
None
See application file for complete search history.

(56) References Cited

U.S. PATENT DOCUMENTS 9,331,900 B2 * 5/2016 Gorajala Chandra ....................... H04L 41/0803
2008/0020801 A1 * 1/2008 Fesas .................... H04W 28/18 455/561
2010/0313262 A1 * 12/2010 Mehta ................. H04L 63/0823 726/12

FOREIGN PATENT DOCUMENTS

CN     102790962 A    11/2012
CN     102811447 A    12/2012
(Continued)

OTHER PUBLICATIONS

Supplementary Partial European Search Report dated Oct. 18, 2017 received in European Application No. 15 85 3970.0.
(Continued)

*Primary Examiner* — Brian S Roberts
(74) *Attorney, Agent, or Firm* — McDonald Hopkins LLC (57) ABSTRACT

A switching-on method for implementing automatic switching-on of base station, which is applied on a base station, includes: establishing, by the base station, an interactive link with a base station controller; transmitting, by the base station, an identifier uniquely identifying the base station; and receiving, by the base station, switching-on parameters corresponding to the identifier and executing the switching-on parameters.

7 Claims, 3 Drawing Sheets

(51) Int. Cl.
*H04W 76/11* (2018.01)
*H04W 88/12* (2009.01)
*H04W 24/02* (2009.01)
*H04W 92/12* (2009.01)
*H04J 3/16* (2006.01)

(52) U.S. Cl.
CPC ............ *H04J 3/085* (2013.01); *H04J 3/1623* (2013.01); *H04W 92/12* (2013.01)

(56) References Cited

FOREIGN PATENT DOCUMENTS

| EP | 2 523 526 A1 | 11/2012 |
| EP | 2 530 881 A1 | 12/2012 |
| WO | 2008/033616 A2 | 3/2008 |
| WO | 2012/022242 A1 | 2/2012 |
| WO | 2013/154477 A1 | 10/2013 |

OTHER PUBLICATIONS

International Search Report dated Aug. 5, 2015 issued in PCT/CN2015/077499.
European Extended Supplementary Search Report dated May 4, 2018 received in European Patent Application No. 15 85 3970.0.

* cited by examiner

SWITCHING-ON METHOD, BASE STATION, BASE STATION CONTROLLER, SWITCHING-ON SYSTEM AND STORAGE MEDIUM

CROSS-REFERENCE TO RELATED APPLICATIONS

This application is the 371 application of PCT Application No. PCT/CN2015/077499 filed Apr. 27, 2015, which is based upon and claims priority to Chinese Patent Application No. 201410584295.1, filed Oct. 27, 2014, the entire contents of which are incorporated herein by reference.

TECHNICAL FIELD

The present disclosure relates to technical field of automatic switching-on for a multi-stage base station, and more particularly, to a switching-on method, a base station, a base station controller, a switching-on system, and a storage medium for implementing automatic switching-on of base station in a multi-stage base station.

BACKGROUND

Automatic switching-on is applicable for the first switching-on of a base station and refers to a situation as follow. The base station tries to negotiate, using default configuration, with BSC (Base Station Controller) without any transmission parameters being configured, automatically completes establishment of a underlying carrier link PPP (Point to Point Protocol) link or an MLPPP (Multilink-PPP) link, enables acquisition and configuration of IP parameters, and finally establishes an operation maintenance channel between the base station and OMCB (Operation & Maintenance Center for Base transmitter station) via the Abis interface. On this basis, the OMCB background is able to delivery planned base station switching-on parameters to the base station via a transparent channel by means of whole-table-synchronization and the like. In this way, the base station can be deployed and operated in accordance with the planned parameters after a reboot, such that the automatic switching-on is achieved.

Figure 1:
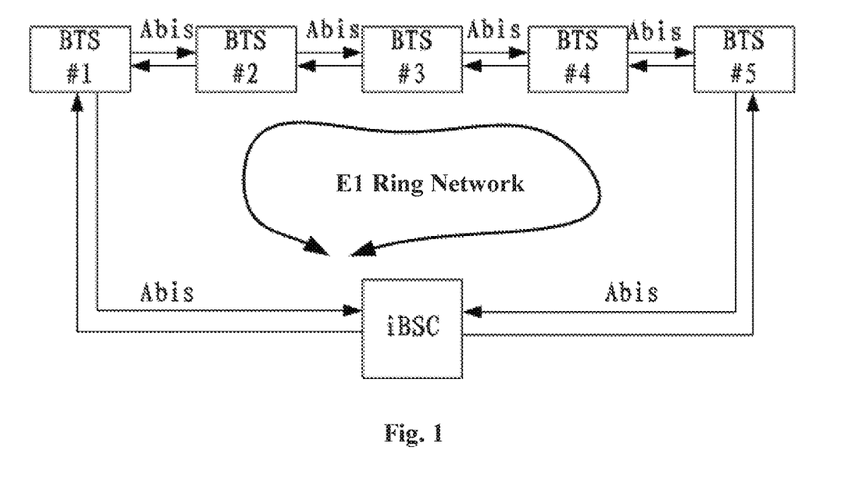
FIG. 1 is a schematic diagram illustrating connections between base stations in an E1 ring network according to related art.

Automatic switching-on of multi-level base stations, for example, multi-level base stations in E1 ring network mode, is more complicated compared to that of a single base station. As shown in FIG. 1, which illustrates connections between base stations in a 5-level E1 ring network, the automatic switching-on thereof will be described as follows. First, after power-on of the station #1, an OMC (Operation and Maintenance Channel) operation maintenance channel is to be established with BSC by means of automatic link establishing based on timeslots. Herein, the automatic link establishing based on timeslots refers to establishing a link with BSC in accordance with timeslot combinations of 1–n (n=1, 2, 3, 4, 5 . . . 31), that is, a total of 31 combinations. Once station #1 succeeds in automatically establishing the link, the maintenance staff can access the base station through a network management background, issue a configuration and then reboot the base station to take the configuration into effect. A main purpose of this configuration is to configure a cross timeslot between stations #1 and #2, so that the Abis port of station #2 can be physically connected with BSC, and then the automatic link establishing is possible. After station #2 succeeds in automatically establishing the link, another configuration is issued through the network management background, so as to configure a cross timeslot between stations #2 and #3. Above process can be also applied to other levels of base station, until station #5 succeeds in automatically establishing the link. After that, a formally planned configuration (switching-on parameters) is delivered to base stations by the maintenance personnel via the operation maintenance channel. At this time, the delivery should be started from the end, that is, station #5, in a level-by-level way, because other stations may be out of link if the delivery starts from station #1. The planned configuration may take effect by rebooting the current base station after the delivery, and other base stations may be operated in a similar manner.

In the above-described automatic switching-on method, when the base station issues switching-on parameters, it is necessary to determine location information and the like of the base station based on IP address of the base station (which is allocated during establishment of the operation maintenance channel) before setting and issuing the switching-on parameters. As the method is applied to multi-level base stations, if any intermediate station (e.g., station #2 in FIG. 1) is not powered on, a direct connection (i.e., a leapfrog link establishment) may exist between stations #3 and #1, thus station #3 physically takes the place of stations #2 to establish a link with BSC. During establishment of the link, BSC may allocate an IP address to the base station through IPCP (IP Control Protocol) negotiation, but the IP address allocated to station #3 through the negotiation is actually that would be allocated to station #2 under normal circumstances, and the switching-on parameters sent to station #3 are actually those would be sent to station #2, which will cause false switching-on of station #3.

Therefore, it is a technical problem that needs to be solved urgently by those skilled in the art to provide a method for realizing automatic switching-on of base station which can reduce switching-on errors for the automatic switching-on of multi-level base stations, especially when there is a leapfrog switching-on.

This section provides background information related to the present disclosure which is not necessarily prior art.

SUMMARY

In order to solve the problem existed in related art, there are provided a switching-on method, a base station, a base station controller and a switching-on system which can reduce switching-on errors.

Technical solution of embodiments of the disclosure is provided as follows.

According to an embodiment of the disclosure, there is provided a switching-on method for implementing automatic switching-on of base station, applied on a base station, including:

establishing, by the base station, an interactive link with a base station controller;

transmitting, by the base station, an identifier uniquely identifying the base station; and receiving, by the base station, switching-on parameters corresponding to the identifier and executing the switching-on parameters.

In an embodiment, when the base station is at a non-final level among multi-level base stations, the method, after the establishing, by the base station, an interactive link with a base station controller, includes:

configuring, by the base station, a cross timeslot for the base station, the cross timeslot comprising communication parameters required for establishing an interactive link between another base station downstream to the base station and the base station controller.

In an embodiment, the communication parameters includes an inlet port and an outlet port, and the configuring, by the base station, a cross timeslot for the base station includes:

determining, by the base station, the inlet port and the outlet port according to port properties of respective ports.

In an embodiment, the port properties include a port function and an on-off state, and the determining, by the base station, the inlet port and the outlet port according to port properties of respective ports includes:

detecting, by the base station, the port function and the on-off state for the respective ports of the base station, and sequentially determining two ports supporting a bypass function and in physical connection as the outlet port and the inlet port.

In an embodiment, the communication parameters further include an outlet timeslot and an inlet timeslot, and the configuring, by the base station, a cross timeslot for the base station includes:

determining, by the base station, the outlet timeslot and the inlet timeslot based on timeslots for establishing the interactive link.

In an embodiment, the determining, by the base station, the outlet timeslot and the inlet timeslot based on timeslots for establishing the interactive link includes:

determining, when the timeslots for establishing the interactive link by the base station includes timeslots 1 to m, timeslots (m+1) to 31 as the inlet timeslot of the cross timeslot and timeslots 1 to (31−m) as the outlet timeslot of the cross timeslot, where m is an integer and 1<m<31.

In an embodiment, the transmitting, by the base station, an identifier includes:

acquiring, by the base station, identification information of the base station upon receiving an identity inquiry message sent from the base station controller, and transmitting the identification information as the identifier to the base station controller via the interactive link.

According to an embodiment of the disclosure, there is provided a switching-on method for implementing automatic switching-on of base station, applied on a base station controller, including:

establishing, by the base station controller, an interactive link with a base station;

acquiring, by the base station controller, an identifier of the base station uniquely identifying the base station; and obtaining, by the base station controller, switching-on parameters for the base station according to the identifier and transmitting the switching-on parameters to the base station.

In an embodiment, the switching-on method further includes:

setting a mapping relation between switching-on parameters and identifiers;

the obtaining, by the base station controller, switching-on parameters for the base station according to the identifier includes:

reading the mapping relation, querying the switching-on parameters corresponding to the identifier from the mapping relation, and determining the queried switching-on parameters as the switching-on parameters for the base station.

In an embodiment, the acquiring, by the base station controller, an identifier of the base station includes:

transmitting, by the base station controller, an identity inquiry message to the base station via the interactive link, receiving and extracting the identifier fed back from the base station.

According to an embodiment of the disclosure, there is provided a switching-on method for implementing automatic switching-on of base station, including:

establishing an interactive link between a base station and a base station controller;

transmitting, by the base station, an identifier uniquely identifying the base station;

acquiring, by the base station controller, the identifier of the base station, obtaining switching-on parameters for the base station according to the identifier and transmitting the switching-on parameters to the base station; and receiving, by the base station, the switching-on parameters corresponding to the identifier and executing the switching-on parameters.

According to an embodiment of the disclosure, there is provided a base station, including:

a first link-establishment module configured to establish an interactive link with a base station controller;

a first transmission module configured to transmit an identifier uniquely identifying the base station; and a switching-on module configured to receive switching-on parameters corresponding to the identifier and execute the switching-on parameters.

According to an embodiment of the disclosure, there is provided a base station controller, including:

a second link-establishment module configured to establish an interactive link with a base station;

an acquisition module configured to acquire an identifier of the base station uniquely identifying the base station; and a second transmission module configured to obtain switching-on parameters for the base station according to the identifier and transmit the switching-on parameters to the base station.

Correspondingly, according to an embodiment of the disclosure, there is provided switching-on system for implementing automatic switching-on of base station, including the base station and the base station controller as described above.

According to an embodiment of the disclosure, there is provided a computer readable storage medium, including a set of instructions used for performing the switching-on method as described above.

According to the embodiments of the present disclosure, after establishing an interactive link between the base station and the base station controller, an identifier, which can be used to uniquely identify the base station, is acquired, and switching-on parameters of the base station are determined according to the identifier and then issued. In this way, each base station is able to obtain correct switching-on parameters corresponding to their location, so that false switching-on can be avoided and it can be solved the problem of false switching-on in related art caused by erroneous delivery of switching-on parameters which are assigned based on IP address of the base station.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are provided for further understanding the technical solution of the present application and which form a part of the specification, are used in conjunction with the embodiments of the present application to explain the technical solution of the present application and do not constitute a limitation on the technical scope of the present application.

DETAILED DESCRIPTION

In order to make features and technical aspects of embodiments of the present disclosure be more fully appreciated, the present disclosure will now be described in detail with reference to the accompanying drawings, which are for illustrative purposes only and are not intended to limit the disclosure.

First Embodiment

Figure 2:
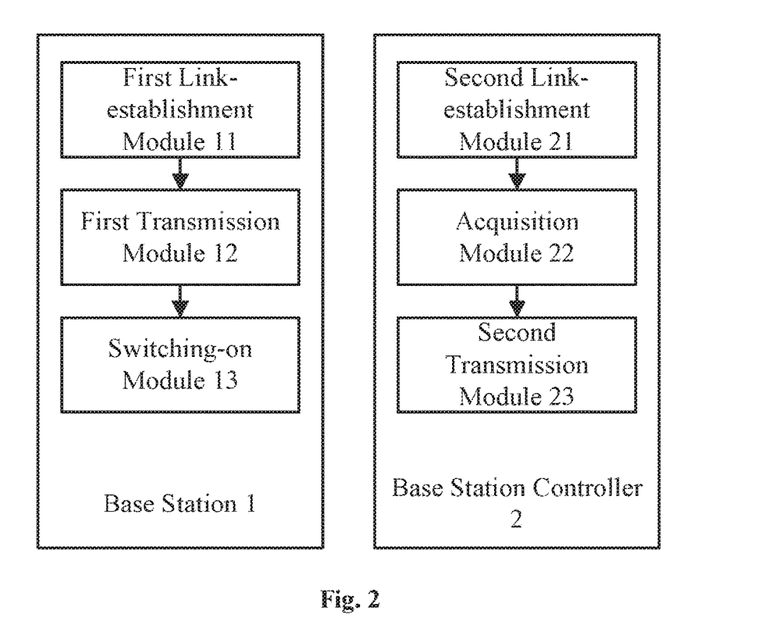
FIG. 2 is a schematic diagram illustrating connections in the switching-on system according to a first embodiment of the disclosure.

FIG. 2 is a schematic diagram illustrating connections in the switching-on system according to a first embodiment of the disclosure. As can be seen from FIG. 2, the switching-on system provided by the embodiment of the disclosure includes a base station 1 and a base station controller 2.

The base station 1 is configured to establish an interactive link with the base station controller 2 and transmit its own identifier to the base station controller 2. The interactive link according to the embodiment of the present disclosure is mainly used for realizing exchange of information required for the switching-on between the base station and the base station controller, and can be either any of existing PPP link, MLPPP link or operation maintenance (OMC) link, or may be a newly defined dedicated link. The identifier involved in the embodiment of the present disclosure is used to uniquely identify the base station, which is a fixed parameter suitable for uniquely identifying each base station, such as an electronic information bar code number (a unique number) of a mainboard within the base station, or a MAC address of a main processor within the base station, or a number assigned by the operator for each base station.

The base station controller 2 is configured to query the identifier of the base station 1 and issues the correct switching-on parameters for the base station 1. Since the identifier can be used to uniquely determine information such as location and the like of the base station, the switching-on parameters required by the base station can be determined by the base station controller and/or maintenance personnel.

The base station 1 is also configured to receive the switching-on parameters, reboot and then execute the switching-on parameters. Since the switching-on parameters received by each base station are the correct station parameters corresponding to their location, no fault will occur in the switching-on.

In an embodiment, as shown in FIG. 2, the base station 1 according to the embodiment of the disclosure includes:

a first link-establishment module 11 configured to establish an interactive link with the base station controller;

a first transmission module 12 configured to transmit an identifier uniquely identifying the base station; and a switching-on module 13 configured to receive switching-on parameters corresponding to the identifier and execute the switching-on parameters.

In some embodiments, when the base station is at a non-final level among multi-level base stations, the base station further includes a cross timeslot configuration module configured to set a cross timeslot for the base station itself. Herein, the cross timeslot may include communication parameters required for establishing an interactive link between another base station downstream to the base station and the base station controller.

In some embodiments, the communication parameters mentioned in the above embodiments include an inlet port and an outlet port, the cross timeslot configuration module is configured to determine the inlet port and the outlet port according to port properties of respective ports. In an embodiment, the port properties include a port function and an on-off state, and the cross timeslot configuration module is further configured to detect the port function and the on-off state for the respective ports of itself, and sequentially determine any two ports supporting a bypass function and in physical connection as the outlet port and the inlet port.

In some embodiments, the communication parameters further include an outlet timeslot and an inlet timeslot, and the cross timeslot configuration module is configured to determine the outlet timeslot and the inlet timeslot based on timeslots for establishing the interactive link. In an embodiment, the cross timeslot configuration module is further configured to determine, when the timeslots for establishing the interactive link by the base station include timeslots 1 to m, timeslots (m+1) to 31 as the inlet timeslot of the cross timeslot and timeslots 1 to (31−m) as the outlet timeslot of the cross timeslot, where m is an integer and $1<m<31$.

In some embodiments, the base station as shown in FIG. 2 further includes a module configured to receive an identity inquiry message sent from the base station controller. Upon receiving the identity inquiry message sent from the base station controller, the base station acquires its own identification information and transmits, using the first transmission module 12, the identification information as the identifier to the base station controller via the interactive link.

In a practical embodiment, the first link-establishment module 11, the first transmission module 12, and the switching-on module 13 each may be implemented by CPU (Central Processing Unit), DSP (Digital Signal Processor) or FPGA (Field Programmable Gate Array) in the base station 1. The above-mentioned CPU, DSP and FPGA may be provided within the base station 1.

In an embodiment, as shown in FIG. 2, the base station controller 2 according to the embodiment of the disclosure includes:

a second link-establishment module 21 configured to establish an interactive link with the base station;

an acquisition module 22 configured to acquire an identifier of the base station uniquely identifying the base station; and a second transmission module 23 configured to obtain switching-on parameters for the base station according to the identifier and transmit the switching-on parameters to the base station.

In some embodiments, the base station controller 2 as shown in FIG. 2 further includes a module configured to set a mapping relation between switching-on parameters and identifiers. The second transmission module 23 is configured to read the mapping relation, query the switching-on parameters corresponding to the identifier from the mapping relation, and determine the queried switching-on parameters as the switching-on parameters for the base station. Specifically, when the operator needs to set up a new base station at a certain location (geographical location), the identifier of the base station device may be recorded. Operation parameters required by the base station provided at the certain location for performing normal communication are determined by the background through calculation and stored as switching-on parameters for the base station at the location, such that a mapping relation between the switching-on parameters and the identifier is generated in the base station controller.

In some embodiments, the acquisition module 22 is configured to transmit an identity query message to the base station via the interactive link, and receive and extract the identifier fed back by the base station. In a practical embodiment, timing for the acquisition module 22 to transmit the identity query message to the base station via the interactive link may be triggered manually by the maintenance personnel or may be automatically triggered. For example, if no request for establishing an interactive link is received in a specified time period after a previous interactive link is established between the base station controller and a certain base station, the base station controller is considered to complete establishment of interactive links with all the base stations, thus the function for obtaining the identity of each base station can be triggered.

In a practical embodiment, the second link-establishment module 21, the acquisition module 22, and the second transmission module 23 each may be implemented by CPU (Central Processing Unit), DSP (Digital Signal Processor) or FPGA (Field Programmable Gate Array) in the base station controller 2. The above-mentioned CPU, DSP and FPGA may be provided within the base station controller 2.

Second Embodiment

Figure 3:
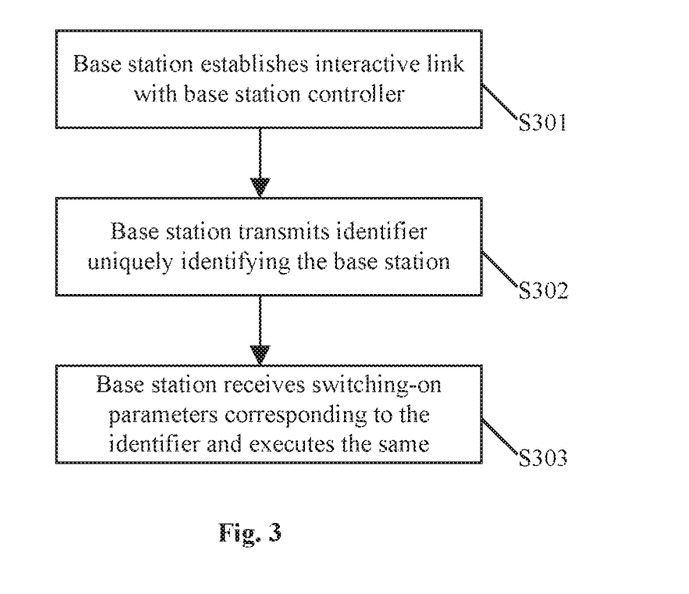
FIG. 3 is flow chart illustrating the switching-on method according to a second embodiment of the disclosure.

FIG. 3 is flow chart illustrating the switching-on method according to a second embodiment of the disclosure. As can be seen from FIG. 3, the switching-on method, which is applied at the base station side, provided by the embodiment of the disclosure includes following steps.

In step S301, the base station establishes an interactive link with a base station controller.

In step S301, the base station transmits an identifier uniquely identifying the base station.

In some embodiment, the step for the base station to transmit the identifier is implemented by acquiring, by the base station, identification information of itself upon receiving an identity inquiry message sent from the base station controller, and transmitting the identification information as the identifier to the base station controller via the interactive link.

In step S303, the base station receives switching-on parameters corresponding to the identifier and executes the switching-on parameters.

In some embodiment, when the base station is at a non-final level among multi-level base stations, the switching-on method as shown in FIG. 3 includes, after the step S301, a step of configuring, by the base station, a cross timeslot for itself. Herein, the cross timeslot is used to transmit in a passthrough mode slot resources to a base station at the lower level and includes communication parameters required for establishing an interactive link between another base station downstream to the base station and the base station controller.

In some embodiments, the communication parameters mentioned in the above embodiments include an inlet port and an outlet port, the step of configuring, by the base station, a cross timeslot for itself mentioned in the above embodiments is implemented by determining the inlet port and the outlet port according to port properties of respective ports, which include a port function and an on-off state, detecting the port function and the on-off state for the respective ports of itself, and sequentially determining any two ports supporting a bypass function and in physical connection as the outlet port and the inlet port.

In some embodiments, the communication parameters mentioned in the above embodiments further include an outlet timeslot and an inlet timeslot, and the step of configuring, by the base station, a cross timeslot for itself mentioned in the above embodiments is further implemented by determining the outlet timeslot and the inlet timeslot based on timeslots for establishing the interactive link. In an embodiment, when the timeslots for establishing the interactive link by the base station include timeslots 1 to m, timeslots (m+1) to 31 are determined as the inlet timeslot of the cross timeslot and timeslots 1 to (31−m) are determined as the outlet timeslot of the cross timeslot, where m is an integer and $1<m<31$.

The embodiment of the present disclosure also provides a first computer readable storage medium including a set of instructions for performing the switching-on method as shown in FIG. 3.

According to the embodiment of the present disclosure, after establishing an interactive link between the base station and the base station controller, an identifier, which can be used to uniquely identify the base station, is acquired, and switching-on parameters of the base station are determined according to the identifier and then issued. In this way, each base station is able to obtain correct switching-on parameters corresponding to their location, so that false switching-on can be avoided and it can be solved the problem of false switching-on in related art caused by erroneous delivery of switching-on parameters which are assigned based on IP address of the base station.

Further, when the base station is at a non-final level among multi-level base stations, the cross timeslot is automatically configured after establishment of the interactive link by the base station, without the need for the maintenance personnel to send through the background of network management. In this way, manual operations can be reduced in the automatic establishment of interactive link among multi-level base stations, and a process of rebooting the current base station for taking the parameters into effect is avoided, thus time cost of switching-on can be substantially saved.

Further, the cross timeslots include both outlet and inlet ports (supporting the bypass function), thus, when a base station at upper level is subject to failures such as power down, an interactive link can be established between the base station controller and a base station at lower level with the bypass function supported by those outlet and inlet ports. In this way, the problem in related art, where it is unable to cope with abnormal situation of power down occurred in some base stations within a ring network, is solved and, thus, a leapfrog switching-on method is provided.

Third Embodiment

Figure 4:
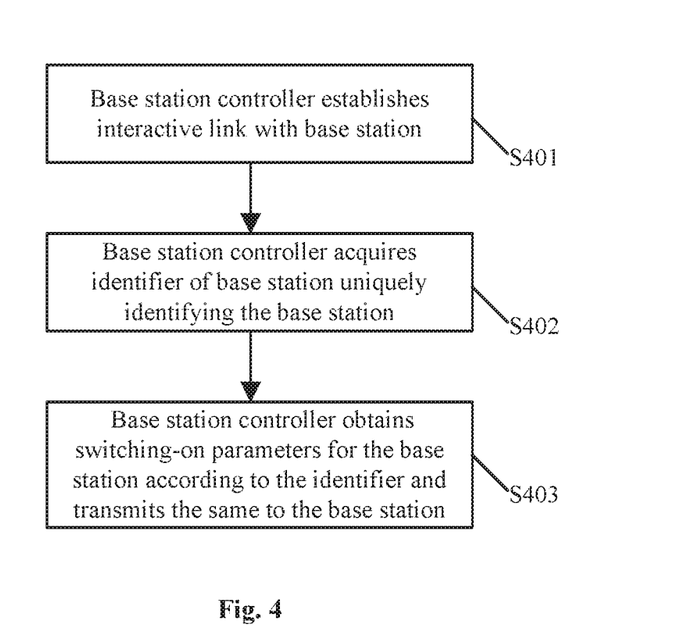
FIG. 4 is flow chart illustrating the switching-on method according to a third embodiment of the disclosure.

FIG. 4 is flow chart illustrating the switching-on method according to a third embodiment of the disclosure. As can be seen from FIG. 4, the switching-on method, which is applied at the base station controller side, provided by the embodiment of the disclosure includes following steps.

In step S401, the base station controller establishes an interactive link with the base station.

In step S402, the base station controller acquires an identifier of the base station uniquely identifying the base station.

In step S403, the base station controller obtains switching-on parameters for the base station according to the identifier and transmits the switching-on parameters to the base station.

In some embodiments, the method as shown in FIG. 4 further includes setting a mapping relation between switching-on parameters and identifiers. The step S403 may be implemented by reading the mapping relation, querying the switching-on parameters corresponding to the identifier from the mapping relation, and determining the queried switching-on parameters as the switching-on parameters for the base station In some embodiments, the acquiring, by the base station controller, an identifier of the base station in the above embodiments is implemented by transmitting, by the base station controller, an identity inquiry message to the base station via the interactive link, receiving and extracting the identifier fed back from the base station.

There is also provided a switching-on method for implementing automatic switching-on of base station. The method may be implemented by: establishing an interactive link between a base station and a base station controller; transmitting, by the base station, an identifier uniquely identifying the base station; acquiring, by the base station controller, the identifier of the base station, obtaining switching-on parameters for the base station according to the identifier and transmitting the switching-on parameters to the base station; and receiving, by the base station, the switching-on parameters corresponding to the identifier and executing the switching-on parameters.

The embodiment of the present disclosure also provides a second computer readable storage medium including a set of instructions for performing the switching-on method as shown in FIG. 4.

The embodiment of the present disclosure also provides a third computer readable storage medium including a set of instructions for performing the switching-on method as shown in FIG. 3 and FIG. 4.

According to the embodiment of the present disclosure, after establishing an interactive link between the base station and the base station controller, an identifier, which can be used to uniquely identify the base station, is acquired, and switching-on parameters of the base station are determined according to the identifier and then issued. In this way, each base station is able to obtain correct switching-on parameters corresponding to their location, so that false switching-on can be avoided and it can be solved the problem of false switching-on in related art caused by erroneous delivery of switching-on parameters which are assigned based on IP address of the base station.

Further, when the base station is at a non-final level among multi-level base stations, the cross timeslot is automatically configured after establishment of the interactive link by the base station, without the need for the maintenance personnel to send through the background of network management. In this way, manual operations can be reduced in the automatic establishment of interactive link among multi-level base stations, and a process of rebooting the current base station for taking the parameters into effect is avoided, thus time cost of switching-on can be substantially saved.

Further, the cross timeslots include both outlet and inlet ports (supporting the bypass function), thus, when a base station at upper level is subject to failures such as power down, an interactive link can be established between the base station controller and a base station at lower level with the bypass function supported by those outlet and inlet ports. In this way, the problem in related art, where it is unable to cope with abnormal situation of power down occurred in some base stations within a ring network, is solved and, thus, a leapfrog switching-on method is provided.

Fourth Embodiment

The present invention will now be described in further detail with reference to specific application examples. As can be seen from FIG. 5, the switching-on method provided by the embodiment of the disclosure includes following steps.

Figure 5:
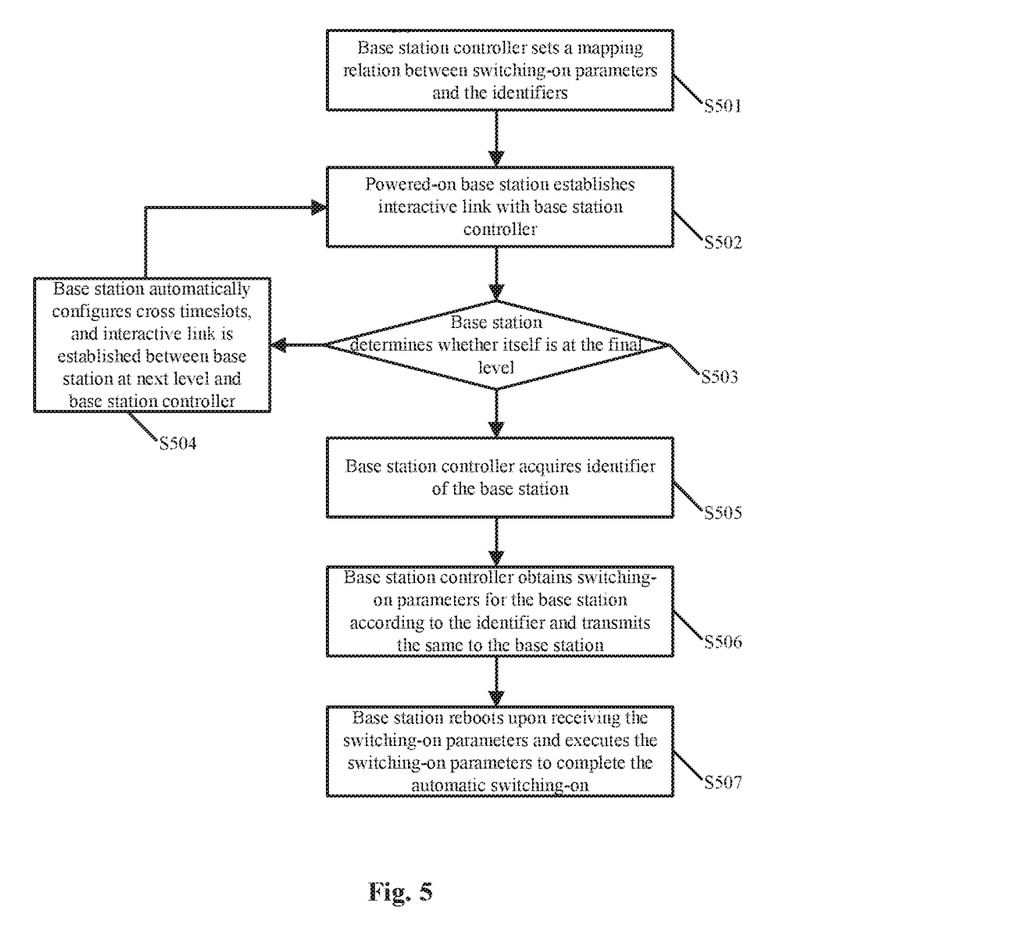
FIG. 5 is flow chart illustrating the switching-on method according to a fourth embodiment of the disclosure.

In step S501, the base station controller sets a mapping relation between switching-on parameters and the identifiers.

When the station equipment is installed before the switching-on, an electronic information bar code number (an example of the identifier) of the main control board of each base station and a station number (corresponding to a uniquely determined geographical location) are recorded and fed back to the network management system. The feedback results are then collected at the network management system and recorded by a background network manager in correspondence with the master control electronic information bar code number and station number of the base station. Operation parameters, which are assigned by the operator for respective base stations at locations corresponding to the station numbers, are acquired and used as switching-on parameters which are used to generate a mapping relation with the identifiers using the station numbers.

In step S502, the base station which is powered on establishes an interactive link with the base station controller.

In an embodiment, when the automatic switching-on is applied on multi-level base stations, an automatic link-establishment is started from the first level of base station among the base stations by establishing the interactive link with the network side device, for example, by establishing an OMC channel with the network management system.

In step S503, The base station determines whether it is at the final level, if yes, step S504 is performed, and if no, step S505 is performed.

If the base station is at the final level, it is indicated that establishment of interactive link between multi-level base stations and the base station controller is completed and the process may enter into delivery of switching-on parameters. If the base station is at a non-final level, it is indicated that establishment of interactive link between multi-level base stations and the base station controller is not completed and, thus, the process of link-establishment is continued.

In step S504, cross timeslots are configured automatically by the base station, an interactive link is established between a base station at next level and the base station controller, and step S503 is performed.

Implementation of this step with respect to a certain level of base station (at the non-final level) may include following steps.

In step 1, the base station try to negotiate with the base station controller using timeslots 1 to m (m starts from 1).

In step 2, if the negotiation fails, step 3 is performed, and if the negotiation succeeds, step 4 is performed.

In step 3, it is determined whether m is greater than 31, if yes, it is indicated the link-establishment fails and step 5 is performed; and if m is less than 31, then m=m+1 and step 1 is performed.

In step 4, a pair of ports, which support bypass function and are in physical connection, are selected as outlet and inlet ports for the cross timeslots; timeslots m+1 to 31 are selected as inlet timeslots of the cross timeslots; and timeslots 1 to 31−m are selected as outlet timeslots of the cross timeslots.

In step 5, the establishment of interactive link at the current base station is completed and the configuration of cross timeslots is ended.

In an embodiment, when the automatic switching-on is implemented for a single base station, the step S505 is performed once the interactive link is established between the base station and the base station controller.

In step S505, the base station controller acquires an identifier of the base station.

When the interactive link is established between the base station and the base station controller, the identifier of the base station can be transmitted to the base station controller (which is generally applicable to switching-on of a single base station), such that the base station controller is able to acquire the identifier of the base station directly.

If the identifier is not uploaded initiatively by the base station, this step may be performed as follows. The base station controller may send an identity inquiry message to the base station via the OMC channel. Upon receiving the message, the base station may retrieve the board bar code information of the main control board within the base station, and package the board bar code information and send it to the base station controller with a feedback message. After receiving the feedback message, the base station controller extracts the bar code information of the main control board (i.e., the identifier of the base station).

In step S506, the base station controller obtains switching-on parameters for the base station according to the identifier and transmits the switching-on parameters to the base station.

The base station controller may inquiry the corresponding station record in the base station identity database using the board barcode information, return the station number of respective base station, retrieve the corresponding switching-on parameters according to the actual station number of the base station, and send the parameters to the base station. If the base station includes multi-level base stations, the switching-on parameters corresponding to each base station may be transmitted level by level in the order from the lower-level base station to the higher-level base station.

In step S507, the base station, upon receiving the switching-on parameters, reboots and executes the switching-on parameters to complete the automatic switching-on.

To sum up, according to implementation of the present disclosure, at least following advantageous effects can be achieved.

After establishing an interactive link between the base station and the base station controller, an identifier, which can be used to uniquely identify the base station, is acquired, and switching-on parameters of the base station are determined according to the identifier and then issued. In this way, each base station is able to obtain correct switching-on parameters corresponding to their location, so that false switching-on can be avoided and it can be solved the problem of false switching-on in related art caused by erroneous delivery of switching-on parameters which are assigned based on IP address of the base station.

Further, when the base station is at a non-final level among multi-level base stations, the cross timeslot is automatically configured after establishment of the interactive link by the base station, without the need for the maintenance personnel to send through the background of network management. In this way, manual operations can be reduced in the automatic establishment of interactive link among multi-level base stations, and a process of rebooting the current base station for taking the parameters into effect is avoided, thus time cost of switching-on can be substantially saved.

Further, the cross timeslots include both outlet and inlet ports (supporting the bypass function), thus, when a base station at upper level is subject to failures such as power down, an interactive link can be established between the base station controller and a base station at lower level with the bypass function supported by those outlet and inlet ports. In this way, the problem in related art, where it is unable to cope with abnormal situation of power down occurred in some base stations within a ring network, is solved and, thus, a leapfrog switching-on method is provided.

It will be appreciated by those skilled in the art that embodiments of the present disclosure may be provided as a method, a system, or a computer program product. Accordingly, the disclosure may take the form of a hardware embodiment, a software embodiment, or a combination of software and hardware aspects. Moreover, the present disclosure may take the form of a computer program product implemented in one or more computer readable storage medium (including but not limited to disk storage and optical memory, etc.) containing computer executable program code.

The present readable has been described with reference to a flowchart and/or block diagram of the method, apparatus (system), and computer program product according to embodiments of the present readable. It will be appreciated that each process and/or block in the flowchart and/or block diagram may be implemented by computer program instructions, as well as a combination of processes and/or blocks in flowcharts and/or block diagrams. These computer program instructions may be provided to a processor of a general purpose computer, a dedicated computer, an embedded processor, or other programmable data processing device to generate a machine such that a device for implementing the functions specified in one or more processes of flowcharts and/or one or more blocks in block diagrams will be generated through instructions executed by a processor of a computer or other programmable data processing device.

These computer program instructions may also be stored in a computer readable memory capable of operating a computer or other programmable data processing device in a particular manner such that instructions stored in the computer readable memory produce a product that includes a command device. The command device may be configured to implement a function specified in one or more processes of flow charts and/or one or more blocks of block diagrams.

These computer program instructions may also be loaded onto a computer or other programmable data processing device such that a series of operational steps are performed on the computer or other programmable device to produce computer-implemented processing. Accordingly, steps for implementing the functions specified in one or more processes of the flowcharts and/or one or more blocks of the block diagrams are provided through the instructions executed on the computer or other programmable device.

The foregoing is a preferred embodiment of the present invention. It should be noted that a number of improvements and modifications may be made by those skilled in the art that without departing from the principles of the invention set forth herein, which will fall within the scope of the invention.

What is claimed is:

1. A switching-on method for implementing automatic switching-on of base station, applied on a base station, comprising:
    establishing, by the base station, an interactive link with a base station controller;
    transmitting, by the base station, an identifier uniquely identifying the base station; and
    receiving, by the base station, switching-on parameters corresponding to the identifier and executing the switching-on parameters,
    wherein, when the base station is at a non-final level among multi-level base stations, the method, after the establishing, by the base station, an interactive link with a base station controller, comprises:
    configuring, by the base station, a cross timeslot for the base station, the cross timeslot comprising communication parameters required for establishing an interactive link between another base station downstream to the base station and the base station controller.

2. The switching-on method according to claim 1, wherein the communication parameters comprise an inlet port and an outlet port, and the configuring, by the base station, a cross timeslot for the base station comprises:
    determining, by the base station, the inlet port and the outlet port according to port properties of respective ports.

3. The switching-on method according to claim 2, wherein the port properties comprise a port function and an on-off state, and the determining, by the base station, the inlet port and the outlet port according to port properties of respective ports comprises:
    detecting, by the base station, the port function and the on-off state for the respective ports of the base station, and sequentially determining two ports supporting a bypass function and in physical connection as the outlet port and the inlet port.

4. The switching-on method according to claim 2, wherein the communication parameters further comprise an outlet timeslot and an inlet timeslot, and the configuring, by the base station, a cross timeslot for the base station comprises:
    determining, by the base station, the outlet timeslot and the inlet timeslot based on timeslots for establishing the interactive link.

5. The switching-on method according to claim 4, wherein the determining, by the base station, the outlet timeslot and the inlet timeslot based on timeslots for establishing the interactive link comprises:
    determining, when the timeslots for establishing the interactive link by the base station comprises timeslots 1 to m, timeslots (m+1) to 31 as the inlet timeslot of the cross timeslot and timeslots 1 to (31−m) as the outlet timeslot of the cross timeslot, where m is an integer and $1<m<31$.

6. The switching-on method according to claim 1, wherein the transmitting, by the base station, an identifier comprises:
    acquiring, by the base station, identification information of the base station upon receiving an identity inquiry message sent from the base station controller, and transmitting the identification information as the identifier to the base station controller via the interactive link.

7. A base station, comprising:
    a processor; and
    a memory configured to store instructions executable by the processor;
    wherein the processor is configured to perform:
    establishing an interactive link with a base station controller;
    transmitting an identifier uniquely identifying the base station; and
    receiving switching-on parameters corresponding to the identifier and executing the switching-on parameters,
    wherein, when the base station is at a non-final level among multi-level base stations, the processor, after the establishing an interactive link with a base station controller, is further configured to perform:
    configuring a cross timeslot for the base station, the cross timeslot comprising communication parameters required for establishing an interactive link between another base station downstream to the base station and the base station controller.

* * * * *